(12) United States Patent
Stroup

(10) Patent No.: US 9,181,669 B2
(45) Date of Patent: Nov. 10, 2015

(54) BLADDER-CONTAINING WALL ASSEMBLIES FOR CONTAINMENT BERMS

(71) Applicant: New Pig Corporation, Tipton, PA (US)

(72) Inventor: Justin L. Stroup, Altoona, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 14/302,972

(22) Filed: Jun. 12, 2014

(65) Prior Publication Data

US 2014/0369761 A1    Dec. 18, 2014

Related U.S. Application Data

(60) Provisional application No. 61/834,159, filed on Jun. 12, 2013.

(51) Int. Cl.
*E02B 7/00*    (2006.01)

(52) U.S. Cl.
CPC ...................... *E02B 7/005* (2013.01)

(58) Field of Classification Search
CPC ................. E02B 7/005; E02B 3/106
See application file for complete search history.

(56) References Cited

U.S. PATENT DOCUMENTS

| | | | |
|---|---|---|---|
| 5,059,065 A * | 10/1991 | Doolaege ..................... | 405/115 |
| 5,090,588 A | 2/1992 | Van Romer et al. | |
| 5,316,175 A | 5/1994 | Van Romer | |
| 5,547,312 A | 8/1996 | Schmitz, Jr. | |
| 5,762,233 A * | 6/1998 | Van Romer ................ | 220/573 |
| 5,820,297 A * | 10/1998 | Middleton ................... | 405/52 |
| 5,924,461 A | 7/1999 | Shaw et al. | |
| 6,012,872 A * | 1/2000 | Perry et al. ................ | 405/114 |
| 6,092,686 A | 7/2000 | Shaw et al. | |
| 6,679,654 B1 * | 1/2004 | Wittenberg et al. ........ | 405/115 |
| 6,715,960 B2 * | 4/2004 | Metz ............................ | 405/116 |
| 6,783,300 B2 * | 8/2004 | Doolaege .................... | 405/115 |
| 6,880,720 B2 * | 4/2005 | Van Romer ................ | 220/573 |
| 6,880,721 B1 | 4/2005 | Barrett et al. | |
| 7,168,588 B2 | 1/2007 | Van Romer | |
| 7,255,137 B2 | 8/2007 | MacDonald | |
| 7,506,777 B2 | 3/2009 | Ramp et al. | |
| 8,016,151 B2 | 9/2011 | Barrett et al. | |
| 8,464,885 B2 | 6/2013 | Ramp et al. | |
| 8,562,251 B2 | 10/2013 | Beak et al. | |
| 8,956,077 B2 * | 2/2015 | Abeles ........................ | 405/111 |
| 2003/0029873 A1 | 2/2003 | Moffat et al. | |
| 2008/0253838 A1 * | 10/2008 | Salemie ...................... | 405/116 |
| 2012/0000914 A1 | 1/2012 | Barrett et al. | |
| 2012/0187119 A1 | 7/2012 | McAtarian et al. | |

* cited by examiner

*Primary Examiner* — Benjamin Fiorello
(74) *Attorney, Agent, or Firm* — Alan G. Towner, Esq.; Pietragallo Gordon Alfano Bosick & Raspanti, LLP

(57) ABSTRACT

A bladder-containing wall assembly for use in containment berms is disclosed. A bladder contained in the wall assembly communicates with the interior area of the containment berm via one or more inlet ports. The bladder self-deploys from the wall upon a substantial spill or leak inside the containment berm in order to increase the fluid containment volume of the containment device. The bladder-containing wall assembly may be substituted for a wall section of either permanent or portable containment berms.

21 Claims, 5 Drawing Sheets

BLADDER-CONTAINING WALL ASSEMBLIES FOR CONTAINMENT BERMS

CROSS-REFERENCE TO RELATED APPLICATION

This application claims the benefit of U.S. Provisional Patent Application Ser. No. 61/834,159 filed Jun. 12, 2013, which is incorporated herein by reference.

FIELD OF THE INVENTION

The present invention relates to containment berms, and more particularly relates to bladder-containing wall assemblies for containment berms.

BACKGROUND INFORMATION

Liquid containment berms are used to prevent hazardous fluids from entering the environment from the spillage of the fluids during, for example, the loading and unloading of storage containers and transport vehicles, wash-down of equipment and vehicles, and repair/maintenance of equipment and vehicles. Conventional containment berms may be intended for permanent use, while others are designed to be portable. One type of permanent containment berm is disclosed in U.S. Pat. No. 5,820,297, which is incorporated herein by reference. Such permanent berms are built from multiple elongated strips connected by corner pieces that are secured to a floor or ground by an adhesive such as caulking. Examples of portable containment berms are disclosed in U.S. Pat. Nos. 5,316,175, 5,762,233, 6,092,686 and 6,880,720, which are incorporated herein by reference.

SUMMARY OF THE INVENTION

The present invention provides bladder-containing wall assemblies for use in containment berms. A bladder contained in the wall assembly communicates with the interior area of the containment berm via one or more inlet ports. The bladder self-deploys from the wall upon a substantial spill or leak inside the containment berm in order to increase the fluid containment volume of the containment device. The bladder-containing wall assembly may be substituted for a wall section of either permanent or portable containment berms.

An aspect of the present invention is to provide a containment berm comprising: at least one fluid-restricting sidewall; and at least one bladder-containing wall assembly attached to the at least one fluid-restricting sidewall. The at least one bladder-containing wall assembly comprises: an interior wall; a bladder having an interior volume; and an inlet port extending through the interior wall in fluid flow communication with the interior volume of the bladder.

Another aspect of the present invention is to provide a bladder-containing wall assembly for a containment berm comprising: an interior wall; a bladder having an interior volume; and an inlet port extending through the interior wall in fluid flow communication with the interior volume of the bladder.

A further aspect of the present invention is to provide a bladder for use in a containment berm, the bladder comprising: an interior volume structured and arranged to contain overflow fluid that is introduced into the containment berm; and an inlet port in fluid communication with the interior volume of the bladder structured and arranged to direct the overflow fluid from the containment berm into the interior volume of the bladder.

These and other aspects of the present invention will be more apparent from the following description.

DETAILED DESCRIPTION

Figure 1:
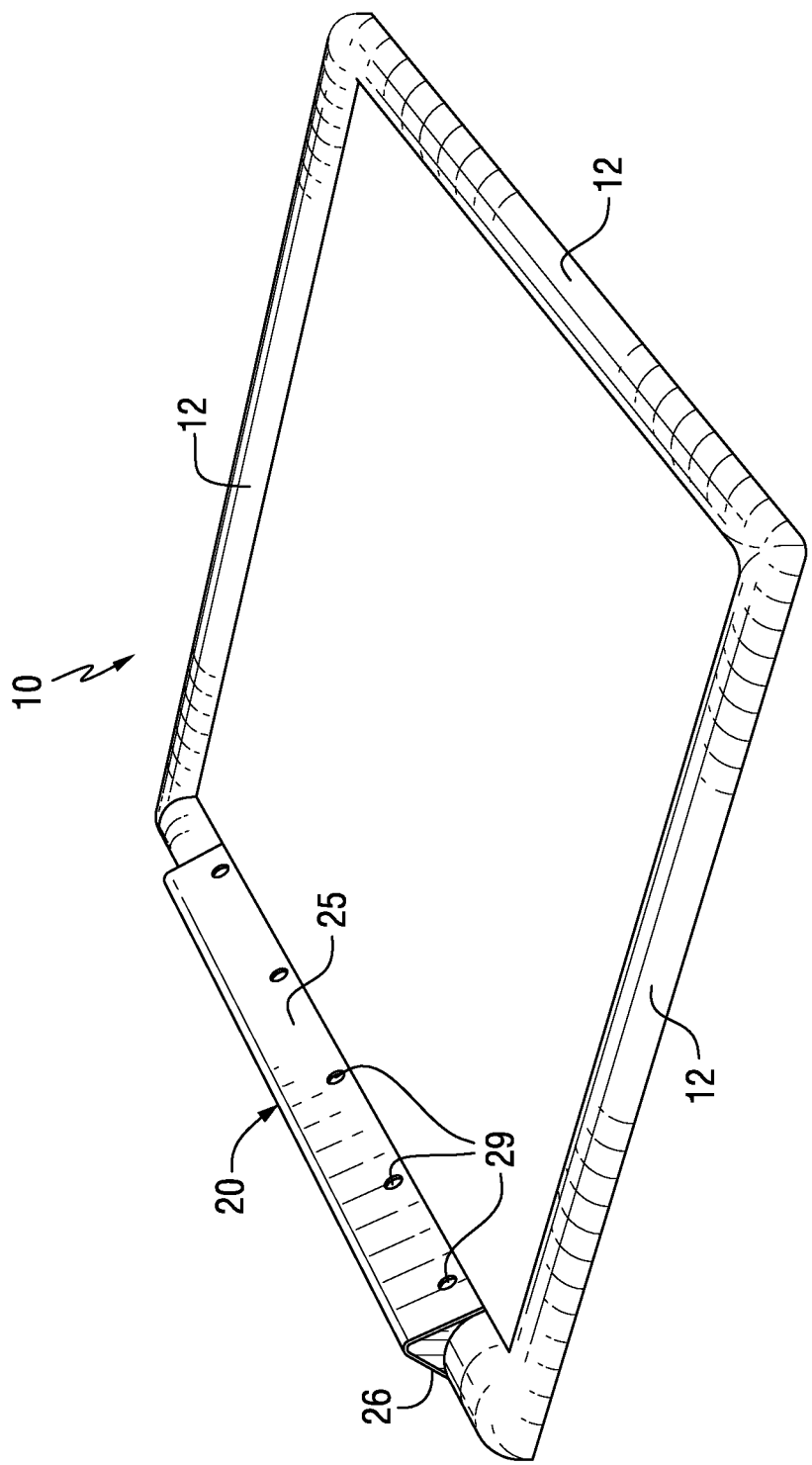
FIG. 1 is an isometric view of a containment berm having a bladder-containing wall with a stowed bladder contained therein in accordance with an embodiment of the present invention.
Figure 2:
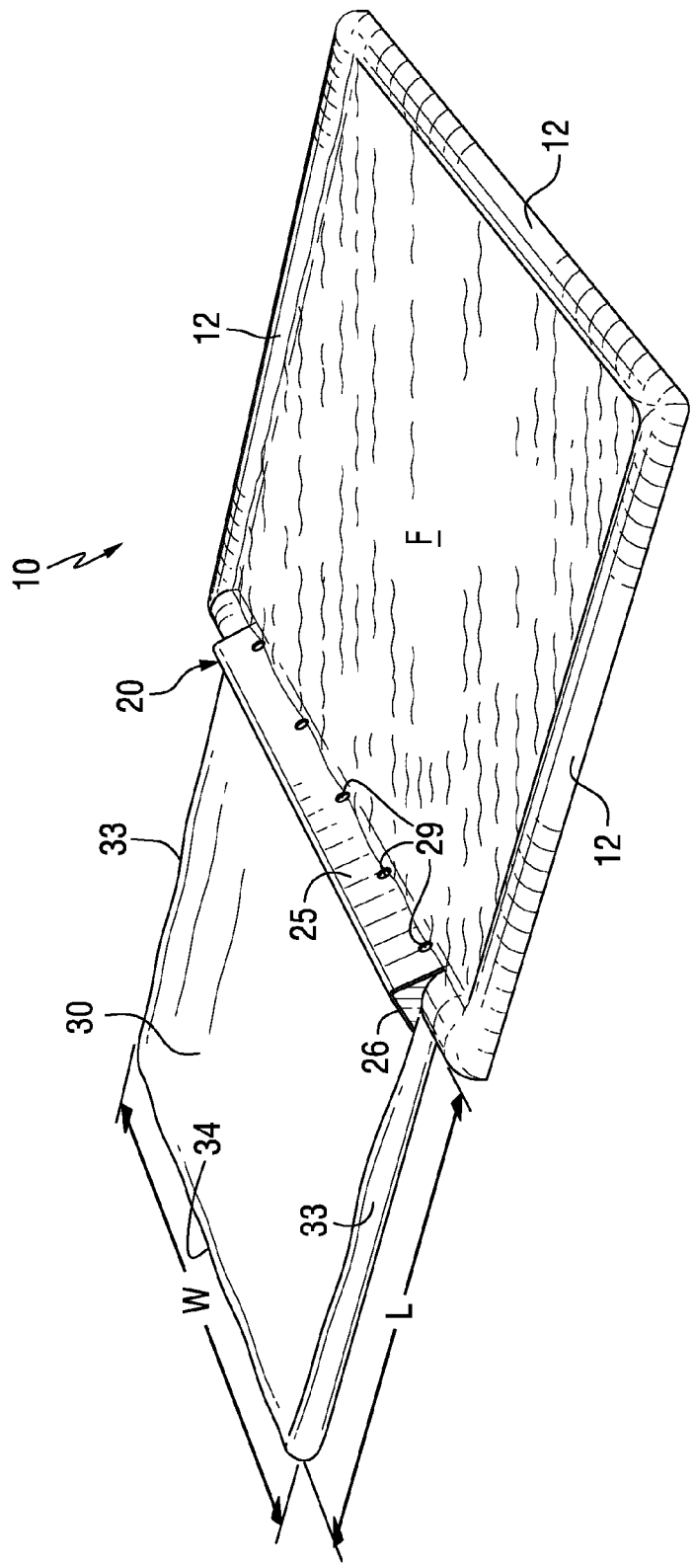
FIG. 2 is an isometric view of the containment berm of FIG. 1, with the bladder deployed from the bladder-containing wall.

FIGS. 1 and 2 illustrate a containment berm 10 in accordance with an embodiment of the present invention. The containment berm 10 includes fluid-restricting sidewalls 12 and a bladder-containing wall assembly 20. In FIG. 1, the containment berm 10 does not have a fluid contained therein and the bladder-containing wall assembly 20 is in a non-deployed position in which a bladder contained therein remains stowed. In FIG. 2, the containment berm 10 has a fluid F contained therein and the bladder-containing wall assembly 20 is in a deployed position in which a filled bladder 30 extended therefrom. The fluid-restricting sidewalls 12 may be of the permanent type, e.g., each fluid-restricting sidewall 12 may be substantially rigid and/or non-collapsible. In certain embodiments, such permanent fluid-restricting sidewalls 12 may be of modular construction, may be secured together with corner pieces, and may be secured to a floor or ground by an adhesive. In other embodiments, the fluid-restricting sidewalls 12 may be flexible and/or collapsible, for example, when the containment berm 10 is of the portable type.

Figure 3:
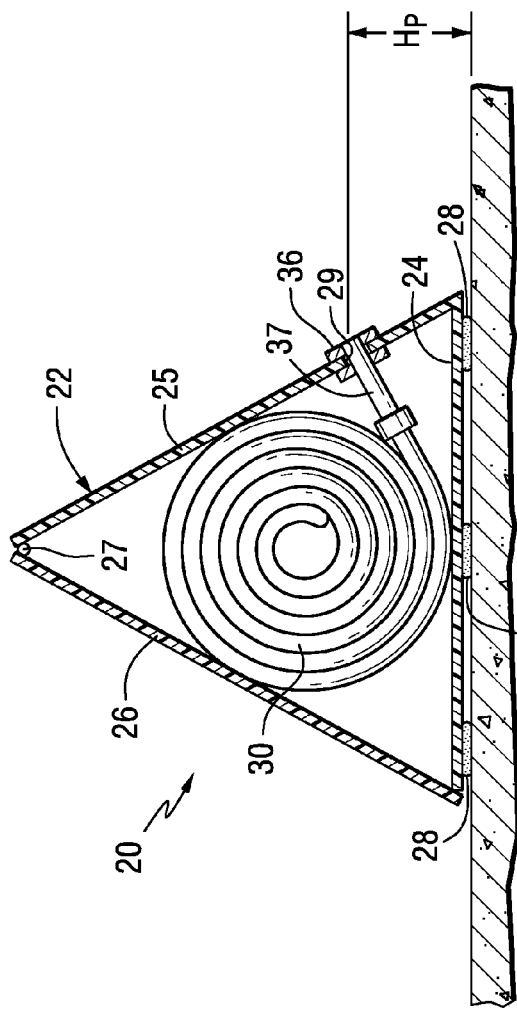
FIG. 3 is a partially schematic cross-sectional view illustrating a bladder-containing wall with a stowed bladder contained therein in accordance with an embodiment of the present invention.
Figure 4:
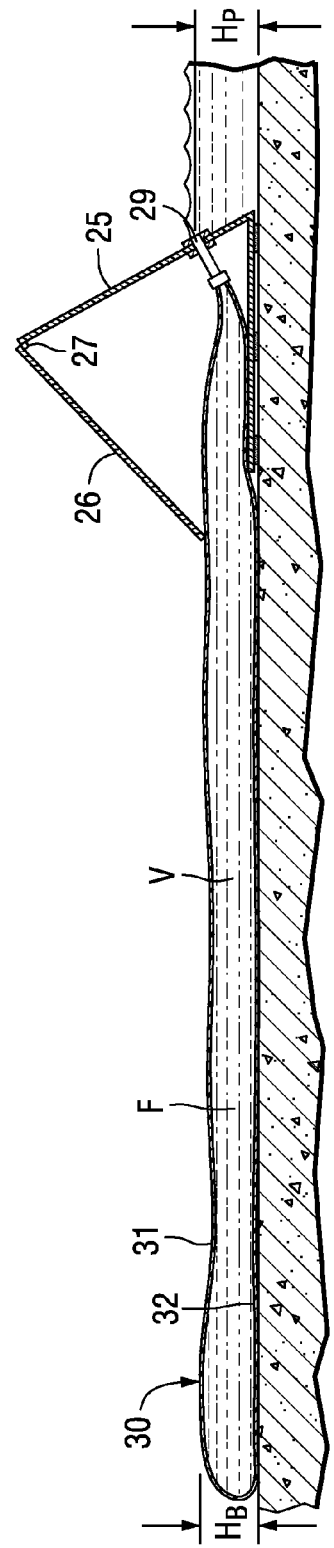
FIG. 4 is a partially schematic cross-sectional view similar to FIG. 3 with the bladder filled with fluid and deployed from the bladder-containing wall.

FIGS. 3 and 4 are partially schematic cross-sectional views illustrating aspects of the bladder-containing wall assembly 20 with the bladder 30 in its stowed position (FIG. 3) and in its deployed position (FIG. 4). As shown in FIGS. 3 and 4, the bladder-containing wall assembly 20 includes a housing 22 having a base 24, interior wall 25 and exterior wall 26. The exterior wall 26 is pivotally mounted on the interior wall 25 by a hinge 27. The hinge 27 may comprise a mechanical hinge, a flexible strip of material, a plastic living hinge or the like. An adhesive 28 or heat welding may be used to secure the housing 22 to a floor or on a bottom fluid-impermeable sheet (not shown) of the containment berm in order to provide a liquid tight containment area. The bladder-containing wall assembly 20 may be bonded at each end to the fluid-restricting sidewalls 12 of the containment berm 10. The heights of the fluid-restricting sidewalls 12 and bladder-containing wall assembly 20 may be selected as desired, e.g., from 1.5 to 18 inches, or from 2 to 12 inches. While the housing 22 shown in FIGS. 3 and 4 has a generally triangular-shaped cross section, any other suitable shape may be used, e.g., rectangular, rounded, and the like.

An inlet port 29 extends through the interior wall 25 to allow fluid communication between the interior volume of the containment berm 10 and the bladder 30 contained within the housing 22. An inlet fitting 36 is provided at the inlet port 29, and a connecting tube 37 provides fluid communication between the inlet port 29 and bladder 30. Although multiple inlet ports 29 are shown in the figures, it is to be understood that any other suitable number may be used, e.g., from a single inlet port to several inlet ports. As shown in FIG. 4, when the fluid F enters the bladder 30 through the inlet ports 29, the bladder 30 unrolls or unfolds and may exit the housing 22 by pressing against and pivoting the exterior wall 26.

In the embodiment shown in FIGS. 3 and 4, the base 24 and walls 25 and 26 are made of rigid or semi-rigid panels of plastic or any other suitable type of material. Alternatively, the housing 22 may be made of one or more flexible sheets of material. For example, the base 24, interior wall 25 and exterior wall 26 may comprise a flexible, fluid impervious, abrasion resistant material, such as modified vinyl or polyurethane coated fabric or nonwoven. In one embodiment, the base 24 and interior wall 25 may comprise a rigid plastic material, and the exterior wall 26 may comprise a flap of flexible sheet material. A reinforcing shell may be included in the housing 22 to prevent the bladder 30 from being restrained if a downward force is applied to the bladder-containing wall assembly 20. In certain embodiments, the reinforcing shell may be enclosed within a fluid impervious flexible covering, e.g., a sheet of fluid-impermeable material (not shown) may be supported by the interior wall 25 or any other suitable support member that prevents unwanted contact between the flexible sheet and the bladder 30.

As most clearly shown in FIGS. 2 and 4, the deployed bladder 30 has opposing upper and lower walls 31 and 32, side edges 33 and an end edge 34, forming a fluid containment zone therebetween. The contained fluid has a volume V. During a spill or the filling of the containment berm 10 with a fluid, the fluid F enters the inlet port 29 and flows into the bladder 30. The fluid F exerts hydrostatic pressure against the interior surfaces of the bladder 30, causing it to unfurl. As the bladder 30 fills, it pushes the exterior wall 26 open and continues to unfurl, extending away from the containment berm 10, thereby increasing the fluid holding capacity of the containment berm 10. The bladder 30 thus extends from the housing 22 in a direction that is substantially perpendicular to the longitudinal direction of the housing 22 and its interior wall 25.

The inlet port(s) 29 are located at a height Hp above the floor or ground. The inlet port height Hp may be selected in order to allow the fluid F to flow into the bladder 30 once the fluid F reaches a sufficient height that will impart sufficient hydrostatic pressure to unfurl the bladder 30. In addition, the inlet port height Hp may also be selected such that the fluid F flows into the inlet ports 29 before it reaches a level that would spill over the fluid-restricting sidewalls 12. For example, the inlet port height Hp may typically range from 0.3 to 18 inches, or from 1 to 6 inches.

The bladder 30 may be made of a fluid impervious flexible material such as polyvinylchloride, polyurethane, polyester, polyethylene, polypropylene, natural rubber, synthetic rubber, or the like. The thickness of such layers may typically range from 1 to 18 mils, for example, from 2 to 5 mils.

As shown most clearly in FIGS. 2 and 4, the fluid-filled deployed bladder 30 has a width W, length L and height H. In certain embodiments, the bladder width W is typically from 1 to 4 feet, for example, typically from 2 to 3 feet. In certain embodiments, the bladder length L is typically from 2 to 10 feet, for example, typically from 3 to 6 feet. In certain embodiments, the bladder height H is typically from 1 to 6 inches, for example, typically from 2 to 4 inches. The contained fluid volume V inside the deployed bladder 30 may be selected in order to provide any desired fluid overflow capabilities for the containment berm 10. In certain embodiments, the capacity of the contained fluid volume V may range from 1 to 150 gallons, for example, typically from 7 to 90 gallons. As a particular example, the fluid volume V capacity may be about 55 gallons to allow the fluid contained in such a bladder to be drained or pumped into a standard 55 gallon storage drum.

Figure 5:
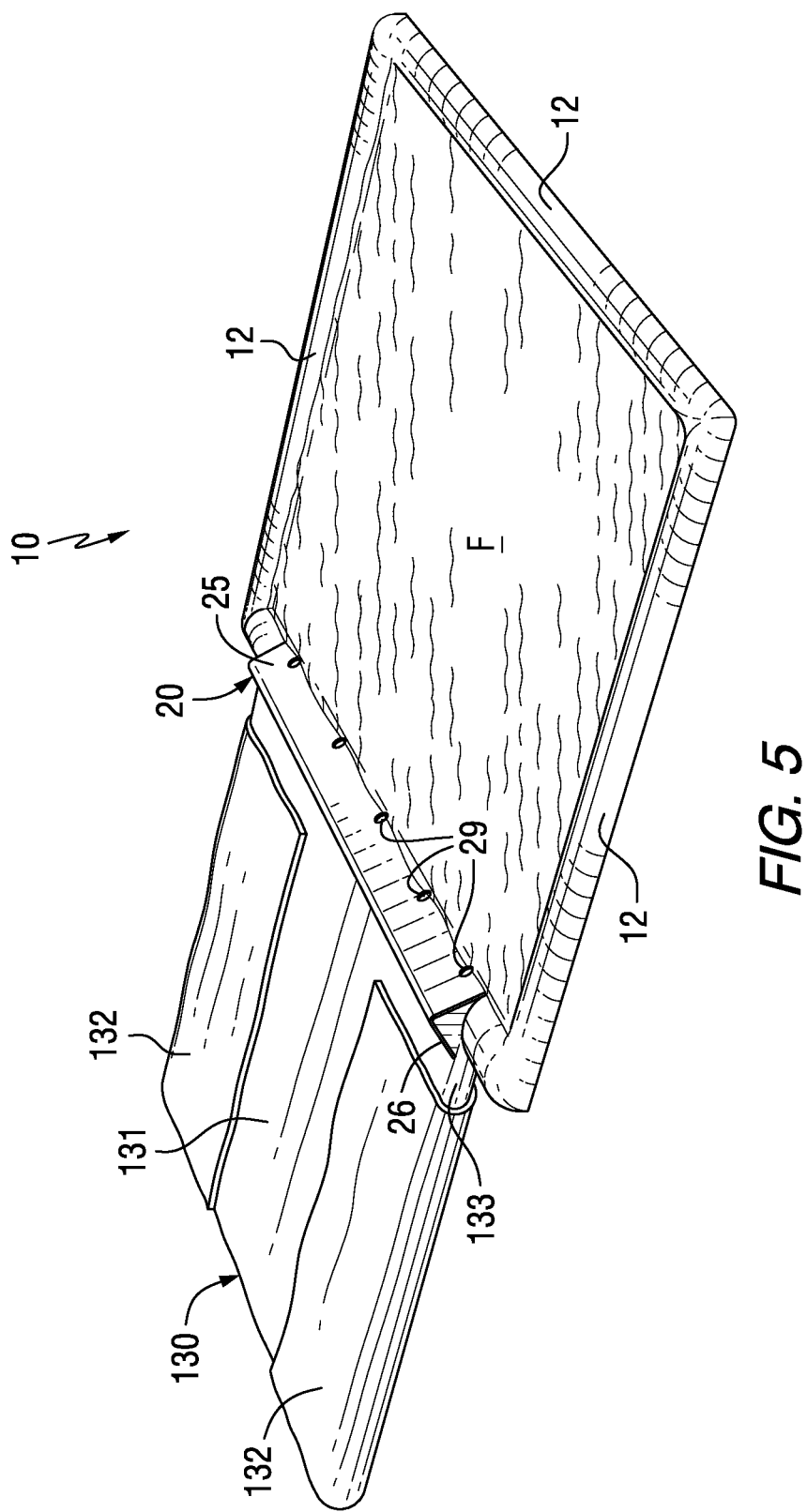
FIG. 5 is an isometric view of a containment berm having a bladder-containing wall with a bladder partially deployed in accordance with an embodiment of the present invention.
Figure 6:
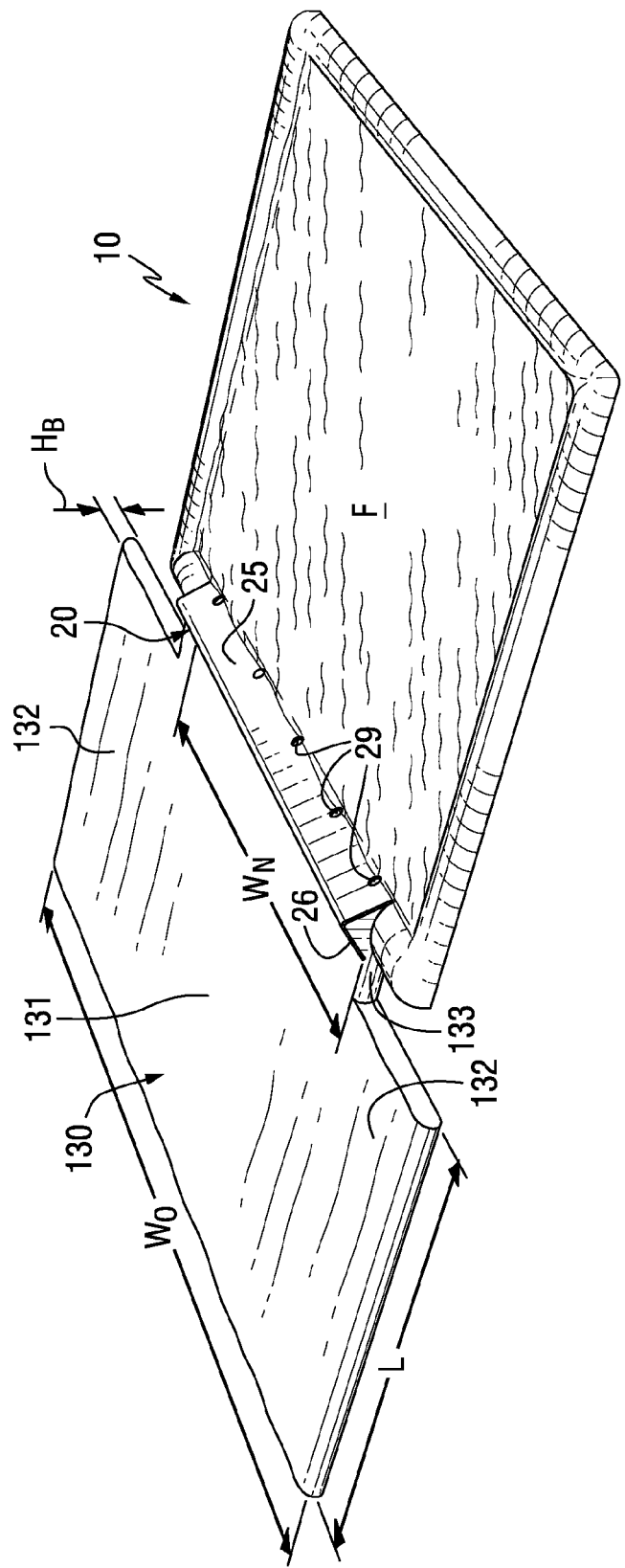
FIG. 6 is an isometric view of the containment berm of FIG. 5, with the bladder fully deployed from the bladder-containing wall.

FIGS. 5 and 6 illustrate another embodiment of the bladder-containing wall assembly 20 in which the bladder 130 includes a central body portion 131 and lateral wings 132 that may be unfolded when the bladder 130 fills with fluid in order to provide additional fluid containment volume. The bladder includes a neck 133 extending into the central body 131.

As shown in FIG. 5, when the bladder 130 is initially filled with fluid, the central body portion 131 unrolls away from the housing 22 in a direction substantially perpendicular to the longitudinal direction of the interior wall 25. At this stage, the lateral wings 132 remain folded over the body portion.

As shown in FIG. 6, when additional fluid flows into the bladder 130, the lateral wings 132 unfold from the body portion 131 due to hydrostatic pressure of the fluid. The lateral wings 132 thus unfold in a direction substantially parallel with the longitudinal direction of the housing 22.

In the embodiment shown in FIGS. 5 and 6, the bladder 130 has an overall width $W_O$ and a neck width $W_N$. In certain embodiments, the overall width $W_O$ of the bladder 130 may range from 1.5 to 8 feet, for example, typically from 3 to 6 feet. The neck width $W_N$ may be similar to the width of the bladder W described above in connection with the embodiment of FIG. 2.

Although a single bladder 30, 130 is shown in the embodiments of FIGS. 1, 2, 5 and 6, it is to be understood that multiple bladder-containing wall assemblies may be used to further increase the overall fluid capacity of the containment berm 10.

Whereas particular embodiments of this invention have been described above for purposes of illustration, it will be evident to those skilled in the art that numerous variations of the details of the present invention may be made without departing from the invention as defined in the appended claims.

What is claimed is:

1. A containment berm comprising:
at least one fluid-restricting sidewall; and
at least one bladder-containing wall assembly attached to the at least one fluid-restricting sidewall, the at least one bladder-containing wall assembly comprising:
an interior wall;
a bladder having an interior volume; and
an inlet port extending through the interior wall in fluid flow communication with the interior volume of the bladder, wherein the bladder is movable from a stowed position in which the bladder is empty to a deployed position extending from the exterior wall in a direction substantially perpendicular to a longitudinal direction of the exterior wall in which the bladder is at least partially filled with a fluid when the fluid is introduced into the containment berm.

2. The containment berm of claim 1, wherein the bladder is rolled when it is in its stowed position.

3. The containment berm of claim 1, wherein the bladder is folded when it is in its stowed position.

4. The containment bean of claim 1, wherein the at least one bladder-containing wall assembly comprises a housing including the interior wall, and the bladder is contained in the housing when it is in its stowed position.

5. The containment berm of claim 4, wherein the housing comprises a base, the interior wall, and an exterior wall.

6. The containment berm of claim 5, wherein the exterior wall is hinged to the interior wall.

7. The containment berm of claim 6, wherein the exterior wall is hinged to the interior wall by a flexible strip of material.

8. The containment berm of claim 5, wherein the exterior wall comprises a flexible sheet of material attached to the interior wall.

9. The containment berm of claim 5, wherein the base of the housing comprises a bottom surface with an adhesive applied thereto for securing the at least one fluid-restricting sidewall to a floor or ground.

10. The containment berm of claim 1, wherein the interior wall comprises a sheet of flexible liquid impermeable material.

11. The containment berm of claim 1, wherein the interior volume of the bladder has a fluid-holding capacity of up to 150 gallons.

12. The containment berm of claim 1, wherein the interior volume of the bladder has a fluid-holding capacity of from 7 to 90 gallons.

13. The containment berm of claim 1, wherein the bladder comprises a central body portion that extends in a direction substantially perpendicular to a longitudinal direction of the interior wall when the bladder is filled with the fluid.

14. The containment berm of claim 13, wherein the bladder further comprises at least one wing in fluid communication with the body portion that extends in a direction substantially parallel with the longitudinal direction of the interior wall when the bladder is filled with the fluid.

15. The containment berm of claim 1, wherein the bladder has a generally rectangular shape when filled with the fluid and has a width of from 1 to 4 feet, a length of from 2 to 10 feet, and a height of up to 6 inches.

16. The containment berm of claim 1, wherein the bladder has a generally T-shape when filled with the fluid comprising a neck portion and a body portion with transverse wings extending therefrom, and wherein the bladder has an overall width of from 1.5 to 8 feet and a neck width of from 1 to 4 feet.

17. The containment berm of claim 1, wherein the at least one fluid-restricting sidewall is non-collapsible and substantially rigid.

18. A bladder-containing wall assembly for a containment berm comprising:
   an interior wall;
   an exterior wall;
   a bladder having an interior volume located between the interior and exterior walls when the bladder is in a stowed position; and
   an inlet port extending through the interior wall in fluid flow communication with the interior volume of the bladder,
   wherein the bladder is movable from the stowed position in which the bladder is empty to a deployed position extending from the exterior wall in a direction substantially perpendicular to a longitudinal direction of the exterior wall in which the bladder is at least partially filled with a fluid when the fluid is introduced into the containment berm.

19. The bladder-containing wall assembly of claim 18, wherein the bladder comprises a central body portion that extends in a direction substantially perpendicular to a longitudinal direction of the interior wall when the bladder is filled with the fluid.

20. The bladder-containing wall assembly of claim 19, wherein the bladder further comprises at least one wing in fluid communication with the body portion that extends in a direction substantially parallel with the longitudinal direction of the interior wall when the bladder is filled with the fluid.

21. A bladder for use in a containment berm, the bladder comprising:
   an interior volume structured and arranged to contain overflow fluid that is introduced into the containment berm; and
   an inlet port in fluid communication with the interior volume of the bladder structured and arranged to direct the overflow fluid from the containment berm into the interior volume of the bladder, wherein the bladder is movable from a stowed rolled position when the interior volume of the bladder is empty to a deployed position in which the interior volume of the bladder is at least partially filled with the overflow fluid from the containment berm.

* * * * *